United States Patent [19]

Sands et al.

[11] Patent Number: 5,021,712

[45] Date of Patent: * Jun. 4, 1991

[54] APPARATUS FOR COMPENSATING FOR IMAGE ROTATION IN A CRT DISPLAY

[75] Inventors: Robert M. Sands, Tyngsboro; John J. Fitzgerald, Leominster, both of Mass.

[73] Assignee: Digital Equipment Corporation, Maynard, Mass.

[*] Notice: The portion of the term of this patent subsequent to Feb. 6, 2007 has been disclaimed.

[21] Appl. No.: 443,663

[22] Filed: Nov. 29, 1989

Related U.S. Application Data

[63] Continuation of Ser. No. 195,401, May 13, 1988, Pat. No. 4,899,082, which is a continuation of Ser. No. 30,459, Mar. 25, 1987, abandoned.

[51] Int. Cl.$^5$ .............................................. H01J 29/06
[52] U.S. Cl. ...................................... 315/8; 315/370; 313/433; 335/213
[58] Field of Search ............................ 315/8, 85, 370; 335/210, 211, 212, 213; 313/433

[56] References Cited

U.S. PATENT DOCUMENTS

| | | | |
|---|---|---|---|
| 3,018,401 | 1/1962 | Stanley et al. | 313/85 |
| 3,735,193 | 5/1973 | Ikeuchi | 315/27 |
| 4,296,359 | 10/1981 | Dodds | 315/370 |
| 4,899,082 | 2/1990 | Sands et al. | 315/8 |

FOREIGN PATENT DOCUMENTS

| | | | |
|---|---|---|---|
| 607058 | 10/1960 | Canada | 315/8 |
| 2809725 | 3/1978 | Fed. Rep. of Germany | |
| 3603476 | 8/1987 | Fed. Rep. of Germany | |

Primary Examiner—Robert J. Pascal

[57] ABSTRACT

An image rotation compensation circuit for use with a CRT. The compensation circuit includes a winding which encircles the CRT and is oriented transverse to the path of the electron beam. A controller is connected to the winding and drives a current through the winding to create a magnetic field. The direction and magnitude of the current may be adjusted by the user to substantially cancel an external magnetic field and thus eliminate any image rotation caused thereby.

3 Claims, 2 Drawing Sheets

APPARATUS FOR COMPENSATING FOR IMAGE ROTATION IN A CRT DISPLAY

CROSS REFERENCE TO RELATED APPLICATIONS

This application is a continuation of prior application Ser. No. 07/195,401, filed May 13, 1988, now issued as U.S. Pat. No. 4,899,082, which is a continuation of Ser. No. 07/030,459, filed Mar. 25, 1987, now abandoned.

BACKGROUND OF THE INVENTION

1. Field of the Invention

This invention relates generally to the field of video display devices which include a cathode ray tube and, more specifically, to those display devices which also include a "yoke" deflection apparatus.

2. Discussion of the Prior Art

A wide variety of video display devices including computer video terminals and the like incorporated a cathode ray tube, or CRT. A CRT includes an electron gun that emits a beam of electrons, which are directed toward a screen. The electron beam is deflected in a controlled manner to scan across the screen. The intensity of the beam is varied to form an image on the screen.

A problem which arises in connection with CRT displays is "image rotation" in which the projected image appears rotated with respect to the horizontal axis of the screen. Image rotation is often caused by the horizontal component of an external magnetic field, one source of which is the earth's magnetic field. The amount of rotation may vary both in direction and magnitude depending on the geographic location of the display, the orientation of the display with respect to the external magnetic field, etc.

One solution to the image rotation problem is to simply disassemble the display device and perform a manual adjustment of the device's deflection apparatus. For example, if the display device includes a yoke magnetic deflection apparatus, the yoke may be manually rotated with respect to the CRT, thereby offsetting the rotation caused by the external magnetic field. However, there are several disadvantages associated with this technique. First, a trained technician is usually required to perform the adjustment and must typically be dispatched to the user's location, which is quite costly for the user.

Second, the disassembling of the display device carries the inherent risk of damage to the interior thereof. In addition, if the display device is later moved to a different geographic location or is simply reoriented with respect to the external magnetic field, a readjustment may be required due to the corresponding change in the direction or magnitude of the external magnetic field.

Another solution to the image rotation problem is to place a shield around the CRT assembly. Shielding is typically quite costly and may create other difficulties. For example, the size of the chassis or housing in which the CRT assembly is disposed must often be increased in order to accommodate the shielding. Moreover, if the CRT assembly requires serice or repair, the shielding obstructs access to the interior of the assembly.

In some CRT displays, an electrostatic deflection apparatus is used to deflect the electron beam, as opposed to a yoke deflector which deflects the beam magnetically. An electrostatic-type deflector includes one or more pairs of plates to which a time-varyin voltage is applied. The electron beam passes between each pair of plates and is deflected by a time-varying electric field that is created by the voltage.

Some electrostatic-type CRT displays, such as an oscilloscope, include a conductive winding which is wrapped directly around the CRT. By providing a current through the winding, a magnetic field is created which may compensate for misalignment of the plates, as well a degradation of the plates due to aging. However, the magnetic field created by the winding cannot be adjusted to compensate for image rotation caused by an external magnetic field.

SUMMARY OF THE INVENTION

The present invention provides a new and improved apparatus for compensating for image rotation in CRT video displays that is caused by an external magnetic field.

In brief summary, the apparatus includes a coil or winding which encircles the CRT and which is oriented substantially transverse to the path of the electron beam. A controller is connected to the winding and operates to drive a current through the winding. The controller adjusts the current's direction and magnitude to create a magnetic field which offsets the external magnetic field, thus eliminating the image rotation caused thereby.

The controller is easily adjusted by the user without disassembly of the display device. As a result, if the display device is relocated or there is a change in the external magnetic field, the controller may simply be adjusted to compensate therefor. The installed apparatus does not substantially affect the dimensions of the CRT assembly. In addition, the apparatus remains separate from the CRT, thereby permitting the separate replacement of either the apparatus or the CRT. The apparatus is low in cost and simple to construct.

BRIEF DESCRIPTION OF THE DRAWINGS

This invention is pointed out with particularly in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
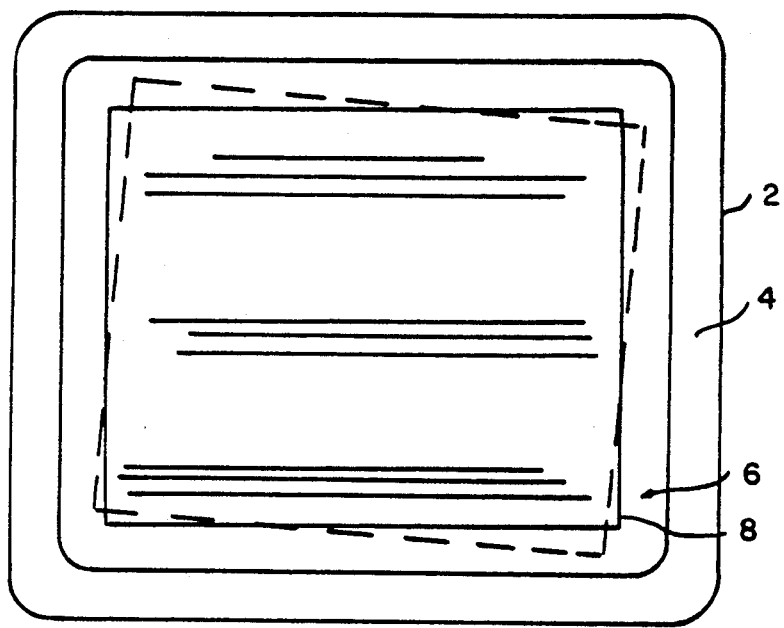
FIG. 1 is a front elevational view of a screen of a video display device showing both a normal image and an image which has been rotated as a result of an external magnetic field.

FIG. 1 is a front elevational view of a video display unit 2 which comprises a chassis 4 and a cathode ray tube (CRT) 6. The CRT 6 displays an image 8 in a well known manner. When the CRT 6 is operating properly, the image 8 is oriented as indicated by the rectangle in solid lines. However, when the CRT 6 is subjected to an external magnetic field, such as that of the earth, the horizontal component of the external field can cause a rotation of the displayed image. as indicated by the rectangle in broken lines. The direction and amount of rotation depend upon the direction and strength of the external magnetic field.

Figure 2:
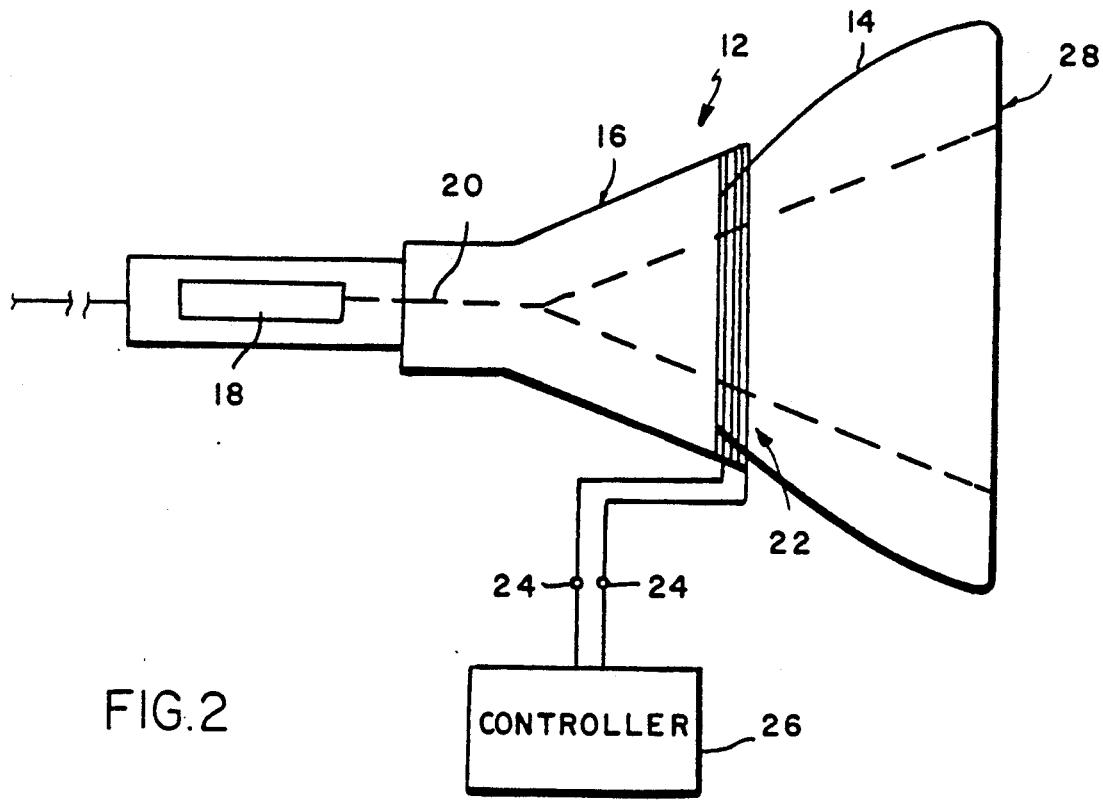
FIG. 2 is a side elevational view of a CRT assembly which incorporates a compensation apparatus constructed in accordance with the preferred embodiment of the present invention.

FIG. 2 is a side elevational view of a CRT assembly 12 which incorporates a compensation apparatus, constructed in accordance with the present invention, for susbtantially eliminating image rotation caused by an external magnetic field. A CRT 14 is disposed within a yoke assembly 16. An electron gun 18 is disposed in the rear portion of the CRT 14. The electron gun 18 emits a beam 20 of electrons, which is deflected by the yoke assembly 16 to form an image on a screen 28. A portion of the yoke assembly 16 is broken away to show a wire coil or winding 22 disposed therein. The winding 22 encircles the CRT 14 and lies in a vertical plane which is preferably oriented sunstantially transverse to the path of the beam 20. The winding 22 has two terminals 24 to which a controller 26 is connected.

In general, the controller 26 generates a current which is conducted through the winding 22 to create a magnetic field. The controller 26 may be adjusted by the user to adjust both the magnitude and direction of the current. Thus, if the CRT assembly 12 is subjected to an external magnetic field which causes a rotation of the displayed image, the user may simply watch the image on the screen 28 while adjusting the controller 26, until a current of the proper magnitude and direction is produced to substantially offset the external magnetic field and thereby eliminate the image rotation.

Figure 3:
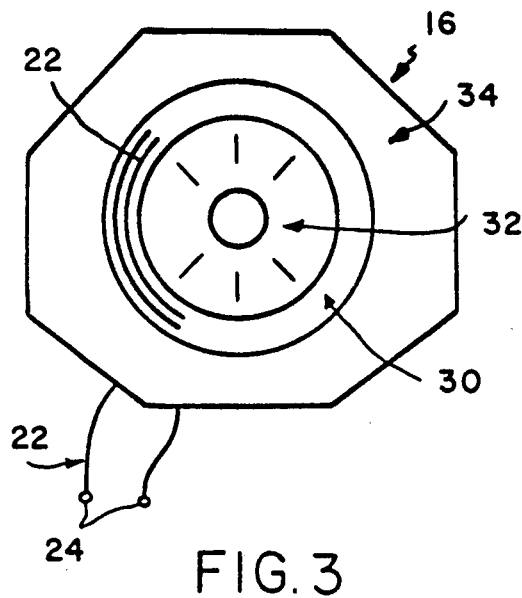
FIG. 3 is a front elevational view of a yoke assembly includes in the CRT assembly depicted in FIG. 2.

FIG. 3 is a front elevational view of the yoke assembly 16 shown in FIG. 2, as seen from the right in FIG. 2. A hollow region 32, in which the CRT 14 is normally disposed, extends longitudinally through the yoke assembly 16. A narrow recessed area 30 encircles the forward end of the hollow region 32.

The recessed area 30 is adapted to receive the winding 22, so that the forward edge of the winding 22 may be susbtantially flush with a front collar 34. As a result, the profile and outside dimensions of the yoke assembly 16 are substantially unaffected by the addition of the winding 22. Moreover, the winding 22 is disposed such that it does not interfere with the deflection functions of the yoke assembly 16. Lastly, it will be appreciated that the yoke assembly 16, along with the winding 22, may be removed or replaced separately from the CRT 14.

Figure 4:
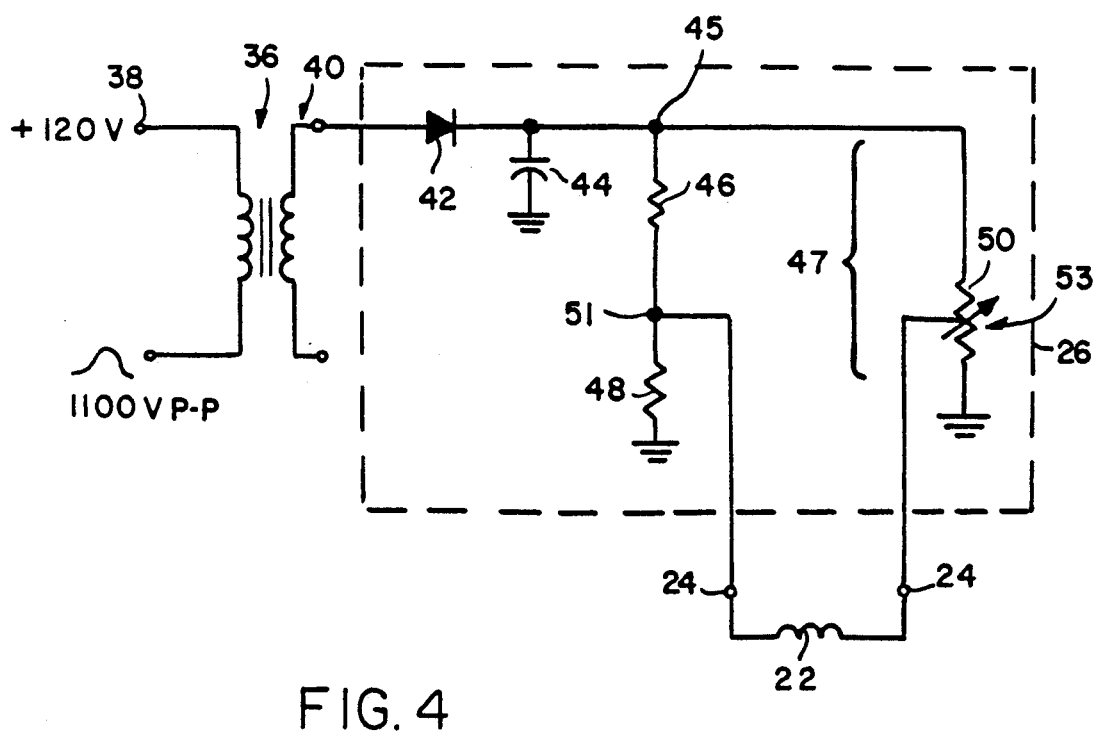
FIG. 4 is a schematic circuit diagram of a controller, which forms part of the compensation apparatus shown in FIG. 2.

FIG. 4 is a detailed schematic circuit diagram of the controller 26 (FIG. 2). With reference to FIG. 4, an alternating voltage from a transformer 36 is rectified by a diode 42 and filtered by a capacitor 44 to provide a substantially direct current voltage to a node 45. A bridge circuit 47 is also connectd to the node 45 and to the winding 22. The bridge circuit 47 serves to control the direction and magnitude of the current which is conducted through the winding 22 to thereby control the direction and magnitude of the magnetic field generated by the winding. In particular, two resistors 46 and 48 form a voltage divider which produces a substantially fixed voltage reference at a node 51. The winding 22 is connected between the node 51 and a variable tap 53 of a potentiometer 50.

By varying the tap 53, the user may vary the magnitude of the resistance between the tap 53 and the node 45, and the resistance between the tap 53 and ground potential, thus varying the voltage level at the tap 53. Since the voltage level at the node 51 is fixed, the voltage difference between the tap 53 and the node 51 is effectively varied by adjusting the position of the tap 53. Thus, if the voltage level at the tap 53 is above that at the node 51, current flows through the winding 22 from the tap 53 to the node 51, with the magnitude of the current being related to the magnitude of the voltage difference and the resistance of the winding 22. Conversely, if the voltage level at the node 51 is above that at the tap 53, the current flows from the node 51 to the tap 53.

The present invention is also suitable for other types of CRT displays, such as those which use an electrostatic deflection apparatus. In an electrostatic-type display, the winding (FIG. 2) is preferably wound around the CRT and is preferably disposed between the deflection apparatus and the screen. The winding is preferably oriented substantially transverse to the path of the electron beam.

In summary, the present invention provides a compensation apparatus which permits a user of a CRT display to quickly and easily eliminate image rotation caused by an external magnetic field. The compensation apparatus is suitable for both electrostatic and magnetic types of display devices and, when installed, does not substantially affect either the dimensions of the CRT assembly nor the functions of the deflection apparatus.

The foregoing description has been limited to a specific embodiment of this invention. It will be apparent, however, that variations and modifications may be made to the invention, with the attainment of some or all of the advanatges of the invention. Therefore, it is the object of the appended claims to cover all such variations and modifications as come within the true spirit and scope of the invention.

What is claimed as new and desired to be secured by Letters Patent of the United States is:

1. A deflection apparatus for use with a cathode ray tube, said cathode ray tube including an electron gun and a screen, said gun for emitting an electron beam along a path toward said screen, said apparatus for deflecting said beam to form an image on said screen, said apparatus being subject to an external magnetic field that tends to interfere with the deflection of said electron beam, said apparatus comprising:

A. deflection yoke means, said yoke means for attachment to said cathode ray tube, said yoke means having a first end and a second end, said first end including a recessed area,
   1. said yoke means further including a conductive winding having first and second ends, said winding being substantially disposed in said recessed area, said winding oriented substantially transverse to said path; and
B. control means, said control means coupled to said first and second ends of said winding, said control means for producing a compensation current which is conducted through said winding, said compensation current producing a compensating magnetic field for substantially canceling said external magnetic field.

2. The apparatus as in claim 1 wherein said control means includes means for adjusting the direction and magnitude of said compensation current.

3. The apparatus as in claim 2 wherein said means for adjusting comprises a voltage reference means and a variable resistance means, said first end of said winding being connected to said voltage reference means, said second end of said winding being connected to said variable resistance means, said voltage reference means for producing a substantially constant voltage at said first end, said variable resistance means for producing a variable voltage at said second end.

* * * * *